(12) United States Patent
Otsuka et al.

(10) Patent No.: US 6,333,284 B1
(45) Date of Patent: Dec. 25, 2001

US006333284B1

(54) SYNTHETIC FUSED SILICA MEMBER

(75) Inventors: Hisatoshi Otsuka, Naka Kubiki-gun; Kazuo Shirota, Naka Kuabiki-gun; Kazuhiro Kumakura, Kashima-gun, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/520,442

(22) Filed: Mar. 7, 2000

(30) Foreign Application Priority Data

Mar. 12, 1999 (JP) .................................................. 11-067520

(51) Int. Cl.$^7$ ...................................................... C03C 3/06
(52) U.S. Cl. ................................................... 501/54; 430/5
(58) Field of Search ................................... 501/54; 430/5

(56) References Cited

U.S. PATENT DOCUMENTS

| 4,221,825 | * | 9/1980 | Guerder et al. . | |
| 4,367,013 | * | 1/1983 | Guerder et al. | 501/57 |
| 5,326,729 | | 7/1994 | Yaba et al. . | |
| 5,335,306 | * | 8/1994 | Takita et al. | 501/37 |

FOREIGN PATENT DOCUMENTS

| 0 691 312 A1 | 1/1996 | (EP) . |
| 0 835 848 A2 | 4/1998 | (EP) . |
| 0 878 451 A1 | 11/1998 | (EP) . |
| 0 901 989 A1 | 3/1999 | (EP) . |
| 1 043 282 A1 | 10/2000 | (EP) . |
| A-7-291635 | 11/1995 | (JP) . |
| 08067530 | 3/1996 | (JP) . |

OTHER PUBLICATIONS

Awazu, Koichi, et al., "Gaseous species and their photo-chemical reaction in $SiO_2$", Journal of Non Crystalline Solids, 1994, vol. 179, pp. 214–225 (No month).

* cited by examiner

Primary Examiner—David R. Sample
(74) Attorney, Agent, or Firm—Oliff & Berridge, PLC

(57) ABSTRACT

There is disclosed a synthetic fused silica member used at a wavelength of 200 nm or less which has a hydroxyl group-content of 1 to 50 ppm and a fluorine-content of 100 to 1000 ppm, and contains no chlorine, and has a birefringence of the synthetic fused silica member of 2 nm/cm or less. The synthetic fused silica member can be used as a synthetic fused silica substrate for photomask, or in an optical system wherein a fluorine excimer laser is used as a light source. There can be provided a synthetic fused silica member which can efficiently transmit a light having a wavelength as 200 nm or less, especially fluorine excimer laser (157 nm), and does not suffer from lowering of transmittance due to damage.

2 Claims, No Drawings

SYNTHETIC FUSED SILICA MEMBER

BACKGROUND OF THE INVENTION

1. Field of the Invention

The present invention relates to a synthetic fused silica member used, for example, in an exposure apparatus (optical aligner) for producing IC in which a light source providing light having a wavelength of 200 nm or less such as fluorine excimer laser or the like is used, especially a synthetic fused silica substrate for photomask.

2. Description of the Related Art

Along with a recent increase in the degree of integration of semiconductor device, there has been required for improving accuracy of micromachining in so-called photolithography technique. In order to make fine patterns, it is necessary to use a light source providing a light having shorter wavelength, and higher energy. Therefore, high transmittance and durability to light having short wavelength have been required in optical member to be used.

Conventionally, there have been used synthetic fused silica or fluorite ($CaF_2$) as a photomask, lens or the like in an exposure apparatus for producing semiconductor IC or the like in which a light source providing light having short wavelength, as in ultraviolet region or vacuum ultraviolet region, such as excimer laser or the like is used. Because, only synthetic fused silica and fluoride crystal as represented by fluorite can be practically used as the material having high transmittance to light having wavelength such as KrF (248 nm), ArF (193 nm) excimer laser.

The characteristics of the synthetic fused silica are different depending on methods for producing it. For example, there are the synthetic fused silica having high hydroxyl group-content which is produced from oxyhydrogen flame by "a direct method" and those having low hydroxyl group-content produced by "a soot method" wherein silica sintered body is molten.

As described above, along with increase in a degree of integration of semiconductor devices, a light source providing a light having a shorter wavelength, represented by KrF (248 nm) or ArF (193 nm) excimer laser has been used, and as a result, a photon energy of the light has been increased. When a synthetic fused silica is irradiated with a light having a short wavelength and high photon energy, structural defects which can be substantial damages may be caused in the glass, and the transmittance may be lowered. There is proposed the material in which significant lowering of transmittance is not caused, even when it is irradiated with a light having short wavelength and high photon energy (see, for example, in Japanese Patent KOKAI Hei 7-291635).

However, recently, optical member for light in the vacuum ultraviolet region which has shorter wavelength as 200 nm or less, especially for fluorine excimer laser (157 nm), have been developed. If the optical member used for such a light source having short wavelength can be made of a synthetic fused silica, it would be quite advantageous, since the technology is an extension of the conventional optical exposure technology, and only slight change of processes, for example, change of light source is necessary. Namely, the conventional photolithography technology can be prolonged.

However, the above-mentioned range of the wavelength is close to essential absorption edge of transmittance of the synthetic fused silica. Accordingly, if it is pure $SiO_2$, it is in principle transparent in the range of the wavelength up to 125 nm (see Material Technology-Highly Functional Glass, published by Tokyo University publishing department). However, as described above, an actual synthetic fused silica contains hydroxyl groups, chlorine, metal impurity, or the like depending on the method for production, and absorption due to them has a subtle affect on the transmittance.

On the other hand, fluorite may be used as other material than synthetic fused silica that is excellent in transmittance in the vacuum ultraviolet region. However, it has a coefficient of thermal expansion that is double-digits higher than that of synthetic fused silica. For example, when it is used as a substrate for a photomask, accuracy of dimension gets worse due to affect of thermal expansion, which may lead to blur of patterns. Furthermore, it is disadvantageous that water cannot be used in the steps for polishing a member made of fluorite to be transparent, since fluorite is deliquescent. Accordingly, it is difficult to be machined.

SUMMARY OF THE INVENTION

The present invention has been accomplished to solve the above-mentioned problems. An object of the present invention is to provide a synthetic fused silica member which can efficiently transmit a light having a wavelength of 200 nm or less, especially light from fluorine excimer laser (157 nm), and is not liable to sustain damage causing lowering of transmittance.

To achieve the above mentioned object, the present invention provides a synthetic fused silica member used at a wavelength of 200 nm or less which has a hydroxyl group-content of 1 to 50 ppm and a fluorine-content of 100 to 1000 ppm, and contains no chlorine.

When the synthetic fused silica which has a hydroxyl group-content and a fluorine-content in the above range, and contains no chlorine is used as an optical member for light having a wavelength of 200 nm or less, especially for fluorine excimer laser (wavelength of 157 nm), it can transmit the light well, and it is durable for long hours of use.

In that case, the synthetic fused silica member can be produced so that birefringence may be 2 nm/cm or less.

Thereby, light can be uniformly transmitted, and therefore, blur of patterns is not caused on exposure, for example, in photolithography.

The synthetic fused silica of the present invention is very useful when it is used as a synthetic fused silica substrate for photomask used at a wavelength of 200 nm or less. It can be used in an optical system wherein a fluorine excimer laser is used as a light source.

Accordingly, the present invention is practically very useful from a practical standpoint, since it can prolong the conventional photolithography technique.

According to the present invention, the synthetic fused silica member contains a desired amount of hydroxyl groups and a desired amount of fluorine, and no chlorine, and therefore it can efficiently transmit light having a wavelength of 200 nm or less, especially the fluorine excimer laser (157 nm), and is durable for long hours of use. Furthermore, since it may have birefringence of 2 nm/cm or less, it can transmit the light uniformly, and does not cause blur of pattern, for example, in photolithography.

Accordingly, a technology such as photo lithography or the like using a fluorine excimer laser as a light source can be conducted without changing design used in conventional methods, namely prolongation of the technology can be achieved, and therefore, the present invention is significantly excellent from the practical standpoint.

DESCRIPTION OF THE INVENTION AND EMBODIMENT

The present invention will now be described more in detail. However, the invention is not limited thereto.

The inventors of the present invention have made a lot of experiments, and found that if a synthetic fused silica member has a hydroxyl group-content of 1 to 50 ppm and a fluorine-content of 100 to 1000 ppm, and contains no chlorine, and preferably has birefringence of 2 nm/cm or less, there can be improved a transmittance and resistance to the light having a wavelength of 200 nm or less, especially a fluorine excimer laser, and therefore the member can be used as an optical member for the light, and the exposure technology can be prolonged. Then, the inventors have further studied the conditions to complete the present invention.

The synthetic fused silica member of the present invention used for the light having a wavelength of 200 nm or less has a hydroxyl group-content of 1 to 50 ppm, preferably 1 to 30 ppm. If the hydroxyl group-content is more than 50 ppm, transmittance at 157 nm is 10% or less, and is not practically useful. It is preferable that the hydroxyl group-content is as low as possible, since transmittance in the wavelength region of 200 nm or less depends on the hydroxyl group-content in the glass. However, if $\equiv$Si—Si$\equiv$ bonding is formed in glass structure while hydroxyl group content is decreased, there may be caused absorption due to the bonding near the wavelength region of 160 nm, which may lead to significant lowering of transmittance of a fluorine excimer laser (157 nm). Accordingly, the hydroxyl group content is defined not to be lower than 1 ppm. 1 to 30 ppm of the hydroxyl group content can ensure a desired transmittance.

The synthetic fused silica member according to the present invention used at a wavelength of 200 nm or less contains 100 to 1000 ppm, preferably 300 to 800 ppm, more preferably 400 to 600 ppm of fluorine. When the fluorine-content is less than 100 ppm, light resistance will be degraded, which may cause lowering of transmittance during radiation by fluorine excimer laser (157 nm). When the fluorine-content is more than 1000 ppm, $\equiv$Si—Si$\equiv$ bonding is liable to be formed in glass structure so that the transmittance of fluorine excimer laser may be less than 10%. 300 to 800 ppm, preferably 400 to 600 ppm of the fluorine-content can ensure desired transmittance and light resistance.

Preferably, the synthetic fused silica member of the present invention has birefringence of 2 nm/cm or less. Although it depends on a thickness of the synthetic fused silica member, when the birefringence is more than 2 nm/cm, for example, uniform exposure cannot be conducted, so that blur of patterns may be caused. When the birefringence is 2 nm/cm or less, such blur of pattern is not caused.

The synthetic fused silica member of the present invention is also characterized in that it contains no chlorine. If chlorine is contained in the synthetic fused silica, there is caused absorption around 160 nm due to Si—Cl bonding, which lowers transmittance of fluorine excimer laser (157 nm). Accordingly, chlorine-content should be as low as possible. For example, it is preferably not more than the lower limit of the detectable value in radioactivity analysis (0.1 ppm).

The above-described synthetic fused silica member that has a desired hydroxyl group-content and a desired fluorine-content, and contains no chlorine can be produced, for example, as follows.

A mixture of a silane compound containing no chlorine and a fluoro compound containing no chlorine is introduced in oxyhydrogen flame to form a porous silica sintered body. Then, the porous silica sintered body was heated and molten in vacuum or in an atmosphere of an inert gas to form transparent glass, and thereby the synthetic fused silica can be obtained, which is then mechanically machined to be in a desired form to provide a synthetic fused silica member.

The hydroxyl group-content and the fluorine-content can be controlled by controlling a mixing ratio of the silane compound and the fluoro compound to be supplied, a bulk density of the porous silica sintered body, or the like. The synthetic fused silica thus produced contains no chlorine, since the silane compound and the fluoro compound that contain no chlorine are used as a raw material.

The silane compound that contains no chlorine used in the present invention can be a compound represented by the following formula (1):

$$R^1{}_n Si(OR^2)_{4-n} \tag{1}$$

wherein $R^1$ and $R^2$ are methyl, ethyl, propyl, butyl, and n is an integer of 0 to 4.

Examples of the silane compounds include: tetramethoxy silane, tetraethoxy silane, methyl trimethoxy silane or the like.

The fluoro compound that contains no chlorine used in the present invention can be a compound represented by the following formula (2):

$$C_p H_q F_r \tag{2}$$

Wherein p, q, r are integers, provided that they satisfy the formulae: $1 \leq p \leq 3$, $0 \leq q \leq 7$, $1 \leq r \leq 8$.

Examples of the fluoro compounds include: $CF_4$, $CHF_3$, $C_2F_6$, $C_3F_8$, or the like. $SiF_4$ or $SF_6$ can also be used as the fluoro compound.

The silane compound containing no chlorine and the fluoro compound containing no chlorine mentioned above are previously mixed, is introduced in oxyhydrogen flame, and subjected to flame hydrolysis or oxidative destruction to yield silica fine particles containing fluorine, which are then deposited on the heat resistant carrier to form a porous silica sintered body.

A mixing ratio of the silane compound and the fluoro compound (as a ratio of fluoro atoms/(silica atoms and fluoro atoms)) is 5 to 70 atomic %, preferably 5 to 60 atomic %, especially 10 to 50 atomic %.

When the ratio of fluoro atoms/(silica atoms and fluoro atoms) is less than 5 atomic %, fluorine-content in the glass is liable to be 100 ppm or less. When the ratio of fluoro atoms/(silica atoms and fluoro atoms) is more than 70 atomic %, fluorine-content in the glass may be more than 1000 ppm. In that case, hydroxyl group-content will be significantly lowered due to dehydration effect of fluorine, and as a result, $\equiv$Si—Si$\equiv$ bonding is caused in the glass structure, and absorption at 160 nm is caused, resulting in lowering of transmittance.

The bulk density of the porous silica sintered body is 0.3 to 0.6 g/cm$^3$, preferably 0.4 to 0.5 g/cm$^3$. If it is out of the above range, hydroxyl groups cannot be completely removed during vitrification, and will be more than 50 ppm in some cases.

The synthetic fused silica substrate for a photomask can be made by the following method using the synthetic fused silica thus obtained that contains the desired amount of hydroxyl groups, the desired amount of fluorine and no chlorine.

First, the synthetic fused silica is placed in a mold made of heat-resistant material such as carbon or the like, and heated and molten in vacuum or in an atmosphere of an inert gas at a temperature of 1700° C. to 1800° C., and then formed, for example, in a size of 5 to 6 inches cube, or larger by hot forming. The glass ingot thus formed is subjected to anneal treatment at 1000° C. to 1200° C. for one hour or more, and cooled to 900° C. to 1000° C. slowly, for example, at a rate of 15° C./hour or less to remove heat distortion in the glass. By such an anneal treatment, distortion remaining in the glass can be removed, so that a birefringence may be 2 nm/cm or less. Finally, a slicing step and a polishing step are conducted to provide the synthetic fused silica substrate for a photomask.

The synthetic fused silica substrate for a photomask contains 1 to 50 ppm of hydroxyl groups, 100 to 1000 ppm of fluorine and no chlorine, and has a birefringence of 2 nm/cm or less. Accordingly, it is a quite useful synthetic fused silica substrate, as it can efficiently transmit light having a wavelength of 200 nm or less, especially fluorine excimer laser (157 nm), is durable for long hours of use, can transmit light uniformly, and does not cause blur of pattern on exposure.

EXAMPLE

The following examples and comparative examples are being submitted to further explain the present invention. These examples are not intended to limit the scope of the present invention.

Example, Comparative Example

Furon 23 (trade name, manufactured by Showa Denko Co. Ltd.) as a fluoro compound was mixed with 1000 g/hr of tetramethoxy silane ($Si(OCH_3)_4$) as a raw material silane compound with varying a mixing ratio (5 to 70 atomic %), and then was introduced into an oxyhydrogen flame formed by introducing a hydrogen gas at 5 $Nm^3$/hr and an oxygen gas at 6 $Nm^3$/hr into a quartz multiple pipe burner, to form silica fine particles containing fluorine. The particles were deposited on a quartz carrier by spraying it on the carrier rotating at 20 rpm, and then the deposited quartz carrier was withdrawn at a constant rate to provide a porous silica sintered body having a diameter of 300 mm and length of 500 mm. The porous silica sintered body had a bulk density of 0.3 to 0.6 $g/cm^3$.

Then, the porous silica sintered body was placed in a vacuum furnace, and heated in He atmosphere and under atmospheric pressure, with increasing a temperature from room temperature to 1250° C. at a temperature increase rate of 10° C./hour and maintaining at the temperature for 10 hours. Subsequently, the temperature was increased to 1500° C. at a temperature increase rate of 3° C./min to form a transparent glass. Thus, there was produced a transparent fused silica ingot having a diameter of 150 mm, a length of 300 mm and a weight of 11.6 kg.

The resulting ingot was placed in a carbon prism mold having an inner size of 6.7 inches in a vacuum furnace, and heated in an inert gas atmosphere with increase a temperature from a room temperature to 1700–1800° C. over about two hours, and maintaining the temperature for about one hour, and was cooled to a room temperature by turning the electric power off. The resulting ingot had a size of 170 mm square and a thickness of 180 mm.

It was then heated in an atmospheric furnace with increasing a temperature from a room temperature to 1100° C. over 3 hours, and maintaining the temperature for 10 hours in order to remove the remaining heat distortion. Then, it was cooled with decreasing the temperature to 950° C. at a temperature decreasing rate of 1° C./hour, and allowed to be cool in an atmosphere by turning the electric power off.

It was then subjected to surface grinding in order to make a right angle at the edge of the outer surface. The birefringence of the resulting synthetic fused silica block was measured with birefringence evaluation system (manufactured by OAK SEISAKUSYO, type ADR200B), and found to be about 1 nm/cm. It was confirmed that distortion was removed by annealing treatment.

Then, the synthetic fused silica block was sliced to provide a substrate having a thickness of 6.5 mm, the surface of it was then polished to be transparent. The synthetic fused silica substrate having a dimension of 152 mm square and a thickness of 6.4 mm was thereby obtained.

A hydroxyl group-content of the resulting synthetic fused silica substrate for a photomask was obtained from an absorption peak at a wavelength of 2.7 micron. On the other hand, a fluorine-content thereof was determined by cutting the substrate, powdering it, and irradiating it with thermal neutron for 2 minutes by radioactivity analysis (a nuclear reactor: TRIGA-11 type), and quantification was carried out with a Ge detector.

The transmittance of the fluorine excimer laser (157 nm) was measured with vacuum ultraviolet spectrometer (manufactured by Nihon Bunko Co. Ltd., VUV-200 type).

The results were shown in Table 1.

|  | hydroxyl group-content (ppm) | Fluorine-Content (ppm) | transmittance of fluorine excimer laser (%) |
|---|---|---|---|
| Example 1 | 30 | 400 | 40 |
| Example 2 | 10 | 800 | 80 |
| Comparative Example 1 | not detected | 2000 | 0 |
| Comparative Example 2 | 300 | 800 | 0.1 |

Table 1 shows that the substrate of Example of which hydroxyl group-content and fluorine-content were in the range defined according to the present invention had practically useful transmittance of fluorine excimer laser. On the other hand, the substrate of Comparative Example of which hydroxyl group-content and the fluorine-content were not in the range defined according to the present invention hardly transmitted the fluorine excimer laser. The chlorine-content as measured with radioactivity analysis was less than the lower limit of the detectable value in either of the substrates.

The present invention is not limited to the above-described embodiment. The above-described embodiment is a mere example, and those having the substantially same structure as that described in the appended claims and providing the similar action and effects are included in the scope of the present invention.

In the embodiment explained above, the synthetic fused silica containing no chlorine was produced using a silane compound containing no chlorine and a fuloro compound containing no chlorine. The present invention is not limited thereto. For example, the synthetic fused silica can be produced using a silane compound and a fluoro compound containing chlorine such as tetrachlorosilane, and then chlorine can be removed by chlorine dehydration treatment, to provide a desired synthetic fused silica member.

What is claimed is:

1. A synthetic fused silica substrate for photomask used at a wavelength of 200 nm or less which has a hydroxyl group-content of 1 to 50 ppm and a fluorine-content of 100 to 1000 ppm, contains no chlorine, and has birefringence of 2 nm/cm or less.

2. The synthetic fused silica substrate for photomask used at a wavelength of 200 nm or less according to claim 1, wherein said silica substrate is used in an optical system wherein a fluorine excimer laser is used as a light source.

* * * * *